United States Patent [19]
Stingone, Jr.

[11] Patent Number: 6,140,608
[45] Date of Patent: Oct. 31, 2000

[54] HEATED WINDSHIELD WIPER WITH REMOVABLE HEATING ELEMENT

[76] Inventor: Ralph J. Stingone, Jr., 11 Simone Dr., Poughkeepsie, N.Y. 12603

[21] Appl. No.: 09/309,797

[22] Filed: May 11, 1999

[51] Int. Cl.[7] ..................................................... B60L 1/02
[52] U.S. Cl. ........................ 219/202; 219/203; 15/250.09; 15/250.04; 15/250.06; 15/250.07
[58] Field of Search ..................................... 219/202, 203; 15/250.01–250.09, 250.41, 250.48, 250.4

[56] References Cited

U.S. PATENT DOCUMENTS

| | | | |
|---|---|---|---|
| 1,615,612 | 1/1927 | Brees | 15/250.09 |
| 1,730,465 | 10/1929 | Lochrie | 15/250.09 |
| 1,811,440 | 6/1931 | Shepard | 15/250.09 |
| 1,811,717 | 6/1931 | Ellixson . | |
| 1,823,598 | 9/1931 | Frailey | 15/250.09 |
| 1,885,710 | 11/1932 | Gentry et al. | 15/250.09 |
| 2,367,307 | 1/1945 | Osborn | 15/250.09 |
| 2,469,791 | 6/1949 | Schneider . | |
| 2,536,940 | 2/1951 | Johnston et al. | 15/250.09 |
| 2,786,224 | 3/1957 | Dembosky . | |
| 3,447,186 | 6/1969 | Senkewich . | |
| 3,523,626 | 8/1970 | Racine et al. . | |
| 3,574,881 | 4/1971 | Temple . | |
| 3,619,556 | 11/1971 | Deibel et al. . | |
| 3,747,500 | 7/1973 | Redd . | |
| 3,936,901 | 2/1976 | Theckston | 15/250.04 |
| 4,152,808 | 5/1979 | Andregg . | |
| 4,387,290 | 6/1983 | Yasuda . | |
| 4,603,451 | 8/1986 | Vansickle . | |
| 4,670,933 | 6/1987 | Toplenszky | 15/250.07 |
| 4,852,204 | 8/1989 | Wilson | 9/20 |
| 4,928,580 | 5/1990 | McIntyre et al. . | |
| 4,967,437 | 11/1990 | Morse . | |
| 5,189,752 | 3/1993 | Longacre et al. | 15/250.41 |
| 5,325,561 | 7/1994 | Kotlar . | |
| 5,412,177 | 5/1995 | Clark . | |
| 5,426,814 | 6/1995 | Minnick . | |
| 5,488,752 | 2/1996 | Randolph | 15/250.06 |
| 5,539,951 | 7/1996 | Guell et al. | 15/250.04 |
| 5,558,792 | 9/1996 | Gauharou | 219/202 |
| 5,572,765 | 11/1996 | Guell | 15/250.06 |
| 5,632,058 | 5/1997 | Stanak . | |
| 5,676,868 | 10/1997 | Simmons . | |
| 5,699,581 | 12/1997 | Heneghan et al. | 15/250.07 |
| 5,787,543 | 8/1998 | Selders | 15/250.06 |
| 5,791,010 | 8/1998 | Brady et al. | 15/250.07 |
| 5,799,390 | 9/1998 | Dileo et al. | 29/611 |
| 5,826,293 | 10/1998 | Holland | 15/250.06 |
| 5,831,242 | 11/1998 | Gallagher . | |
| 5,832,558 | 11/1998 | Ehret et al. . | |
| 5,841,106 | 11/1998 | Kohler . | |

*Primary Examiner*—Teresa Walberg
*Assistant Examiner*—Vinod D Patel
*Attorney, Agent, or Firm*—Chase & Yakimo, L.C.

[57] ABSTRACT

A windshield wiper assembly for connection to a windshield wiper retainer assembly of a vehicle comprises a housing having a pair of flexible side walls presenting wiping edges depending therefrom and adapted for contact with a windshield. A top wall of the housing spans the side walls and forms a channel therebetween. The top wall further defines at least one aperture in an end thereof. The wiper assembly further includes an elongated heater member having a structure releasably slidable in the channel through the aperture in the top wall. The wiper assembly further includes a plug for connecting a heating element of the heater member to the battery of the vehicle. The heater member cooperates with the side walls to direct heat from the heating element onto the wiper edges and onto the windshield itself. The heater member is slidably interchangeable with a third wiper, the third wiper including a structure that is releasably slidable within the channel.

19 Claims, 7 Drawing Sheets

Section
6-6

HEATED WINDSHIELD WIPER WITH REMOVABLE HEATING ELEMENT

BACKGROUND OF THE INVENTION

This invention relates to windshield wipers for vehicles and, more particularly, to a windshield wiper having a heating element that is positioned between two wiper blades immediately adjacent the windshield and that is interchangeable with a third wiping blade.

Windshield wipers are ineffective in clearing ice and snow from an automobile windshield, at least until the interior defroster has sufficiently heated the windshield. Several heated windshield wiper assemblies have been proposed for heating the blades of the wiper before or during use. Although such devices arguably may be effective in operation, the existing devices exhibit several disadvantages.

Some heated windshield wipers include a heating element that is significantly displaced from the blade wiping surfaces, thus requiring heat to be conveyed inefficiently through somewhat non-conductive materials to the wiping surfaces. Existing devices having heating elements positioned within the wiper further lack optimal heating efficiency in that the windshield itself is not directly heated. Another disadvantage of the known heated windshield wipers is that the heating element must remain within the wiper assembly even during seasons when ice and snow are not encountered.

Therefore, it is desirable to have a windshield wiper which directly heats both the blade wiping edges and the windshield. It is further desirable to have a windshield wiper in which a heating element is easily interchangeable with an additional blade wiping edge.

SUMMARY OF THE INVENTION

Accordingly, I have invented a windshield wiper assembly for connection to a windshield wiper retainer assembly of a vehicle. The wiper assembly comprises a housing having a pair of flexible side walls, each side wall presenting a wiping edge configured to contact a windshield. The housing includes a top wall spanning the side walls and forming a channel therebetween. A heater element is releasably slidable within the channel through an aperture in one end of the top wall. The wiper assembly further includes a plug for connecting the heater element to an electrical source such as the vehicle battery. The heater element cooperates with the side walls to direct heat from the powered heating element onto the wiping edges and onto the windshield proper. The heater element is interchangeable with a third wiper which also includes a structure that is releasably slidable in the channel.

It is therefore a general object of this invention to provide a windshield wiper assembly which can melt ice both from the wiping surfaces of the wipers and from the windshield proper.

Another object of this invention is to provide a windshield wiper assembly, as aforesaid, having at least two wiping edges for clearing precipitation from a windshield.

Still another object of this invention is to provide a windshield wiper assembly, as aforesaid, in which a heating element is positioned between the two wiping edges for directly heating both the wiping edges as well as the windshield proper.

Yet another object of this invention is to provide a windshield wiper assembly, as aforesaid, which is energized by the vehicle battery.

A further object of this invention is to provide a windshield wiper assembly, as aforesaid, which is flexible to conform to the contours of the windshield.

A still further object of this invention is to provide a windshield wiper assembly, as aforesaid, in which the heating element is easily removable from the housing for substitution with another heating element or an additional wiping edge.

Another object of this invention is to provide a windshield wiper assembly, as aforesaid, in which the heating element is releasably coupled to the housing.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
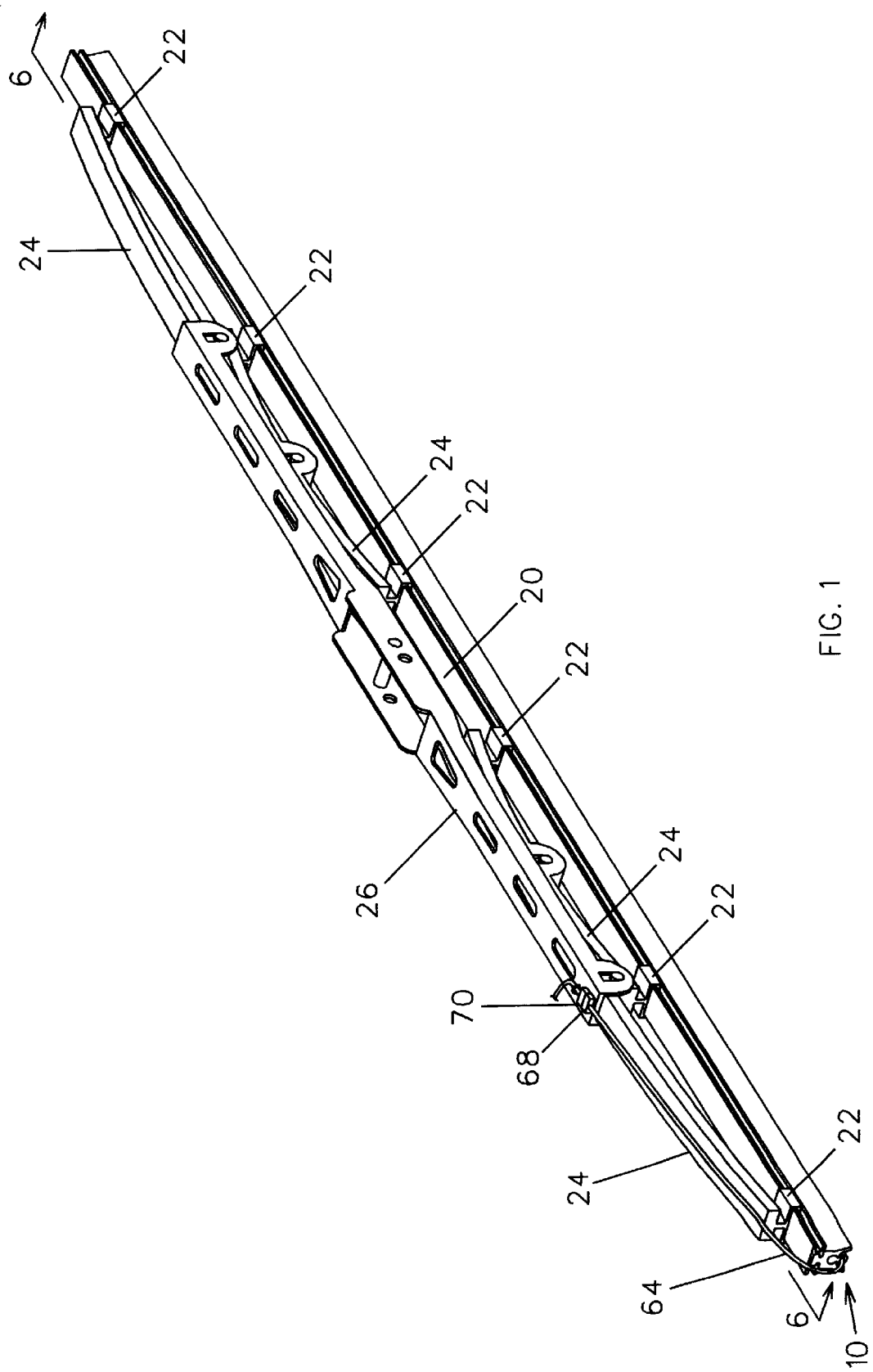
FIG. 1 is a perspective view of the heated windshield wiper assembly according to the present invention.
Figure 2:
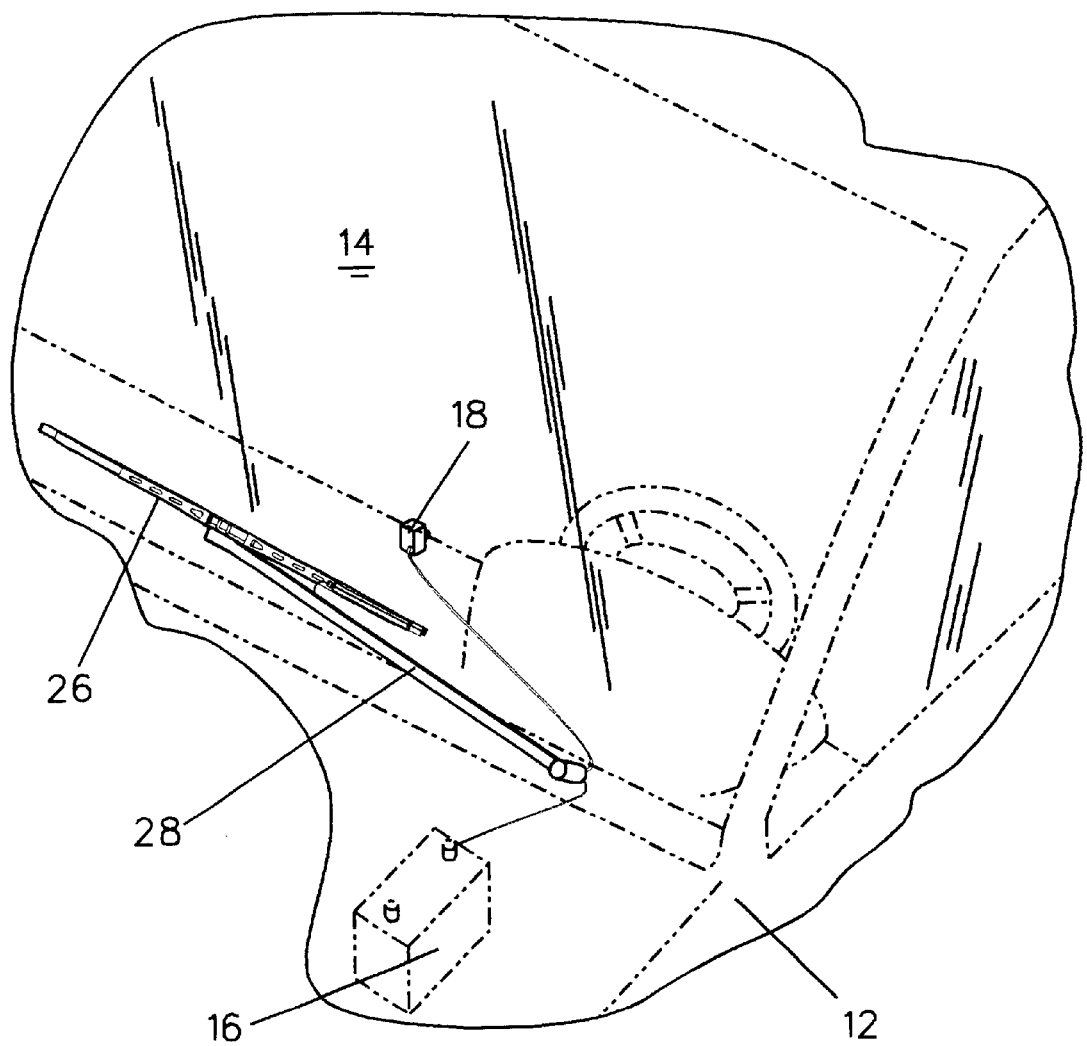
FIG. 2 is a fragmentary perspective view of a vehicle with the windshield wiper assembly of FIG. 1 in use thereon.

Turning more particularly to the drawings, FIGS. 1 and 2 show a windshield wiper assembly 10 mounted on an automobile 12 (FIG. 2) for wiping its front windshield 14. The wiper assembly 10 includes an elongated wiper blade housing 20 slidably received in a plurality of retainer elements 22. The retainer elements 22 are fixedly attached to bows 24 that are coupled to a yoke 26 in a conventional manner. The yoke 26 is coupled to a wiper arm 28 (FIG. 2) of an automobile 12 for oscillating the wiper assembly 10 over the front windshield 14 of the automobile.

Figure 3:
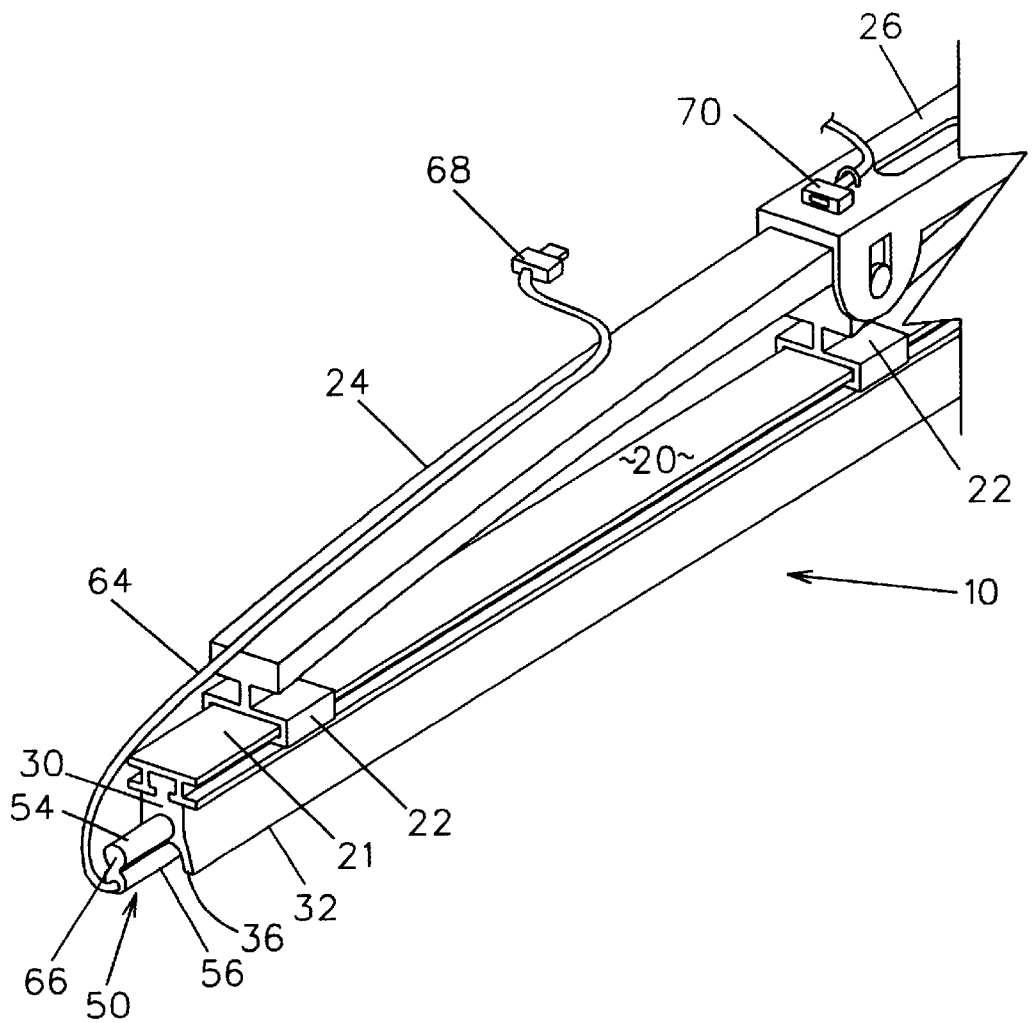
FIG. 3 is a fragmentary view of the windshield wiper assembly of FIG. 1 on an enlarged scale with the heating element partially inserted in the wiper blade housing.
Figure 4:
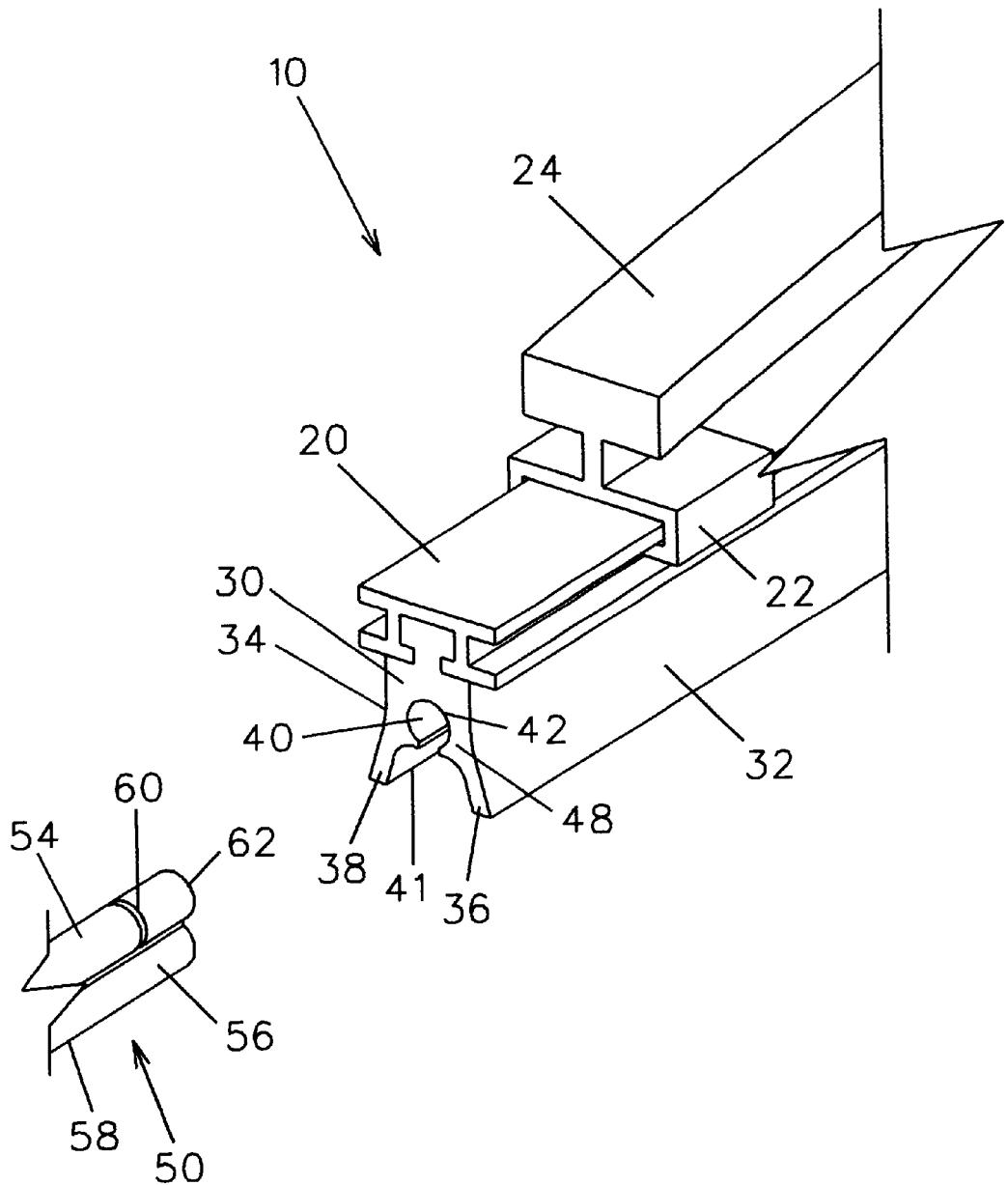
FIG. 4 is a fragmentary view of the windshield wiper assembly of FIG. 1 on an enlarged scale with the heating element removed from the wiper blade housing.
Figure 6:
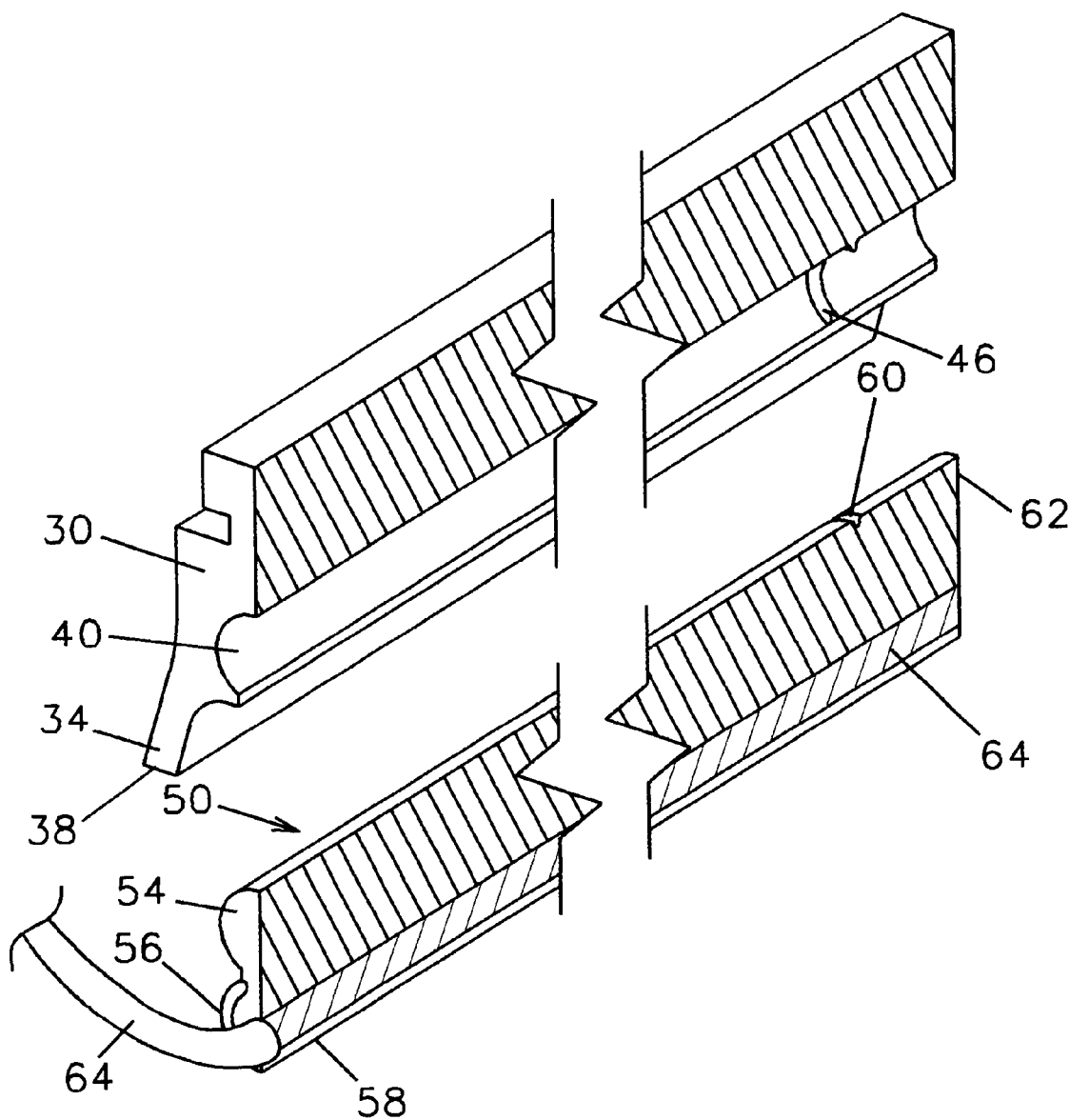
FIG. 6 is a sectional view of the windshield wiper assembly taken along line 6—6 of FIG. 1 foreshortened for purposes of illustration.

The wiper blade proper is constructed of a flexible rubber material or the like. As shown in FIGS. 3 and 4, the blade includes a T-shaped top wall 30 slidable within the channel 21 of housing 20. The blade has spaced apart depending first 32 and second 34 side walls. The spaced apart side walls 32, 34 cooperate with the top wall 30 to form a generally annular channel 40 with openings 41 therebetween. The channel 40 in top wall 30 further presents an aperture 42 in a first end 48 thereof. Each side wall 32, 34, presents flexible depending wiping edges 36, 38, respectively, for wiping a windshield 14 (FIGS. 3 and 4). A flange 46 extends radially about the interior surface of the channel 40 substantially adjacent a second end 49 thereof for releasably mating with a recessed groove 60 on a heating member 50 as to be further described below (FIG. 6).

A heating member 50 is releasably slidable within the channel 40 of the blade 20. The heating member 50 includes upper 54 and lower 56 circular portions constructed of a silicone or synthetic rubber material or the like. The upper portion 54 presents a spherical configuration complementary to the configuration of the channel 40. The lower portion 56 of the heating member 50 depends from upper portion 54 and extends between the side walls 32, 34 of the housing 20. A groove 60 extends radially about the upper portion 54 of the heating member 50 substantially adjacent one end 62 thereof such that the groove 60 releasably mates with the flange 46 when the heating member 50 is completely inserted within the channel 40 (FIG. 6).

A heating element 64 or wire is encompassed within the lower portion 56 of the heating member 50. The heating element 64 extends along portion 56 and from a second end 66 of the lower portion 56 and terminates at plug 68 (FIG. 3). The plug 68 can be selectively coupled to a receptacle 70 which connects the heating element 64 to a power source of the vehicle, such as the vehicle battery 16 of the vehicle (FIGS. 2 and 3). The heating element 64 is energized upon activation of a switch 18 mounted within the passenger compartment of the automobile 12. The lower edge 58 of the lower portion 56 of the heating member 50 contacts the windshield and is preferably coated with Teflon or silicone coated fiberglass so as to protect the heating element 64 from abrasion during wiper oscillation as well as for inhibiting friction. The slidable removal of the heating member 50 allows the heating element 64 to be replaced without replacing the entire housing 20.

Figure 5:
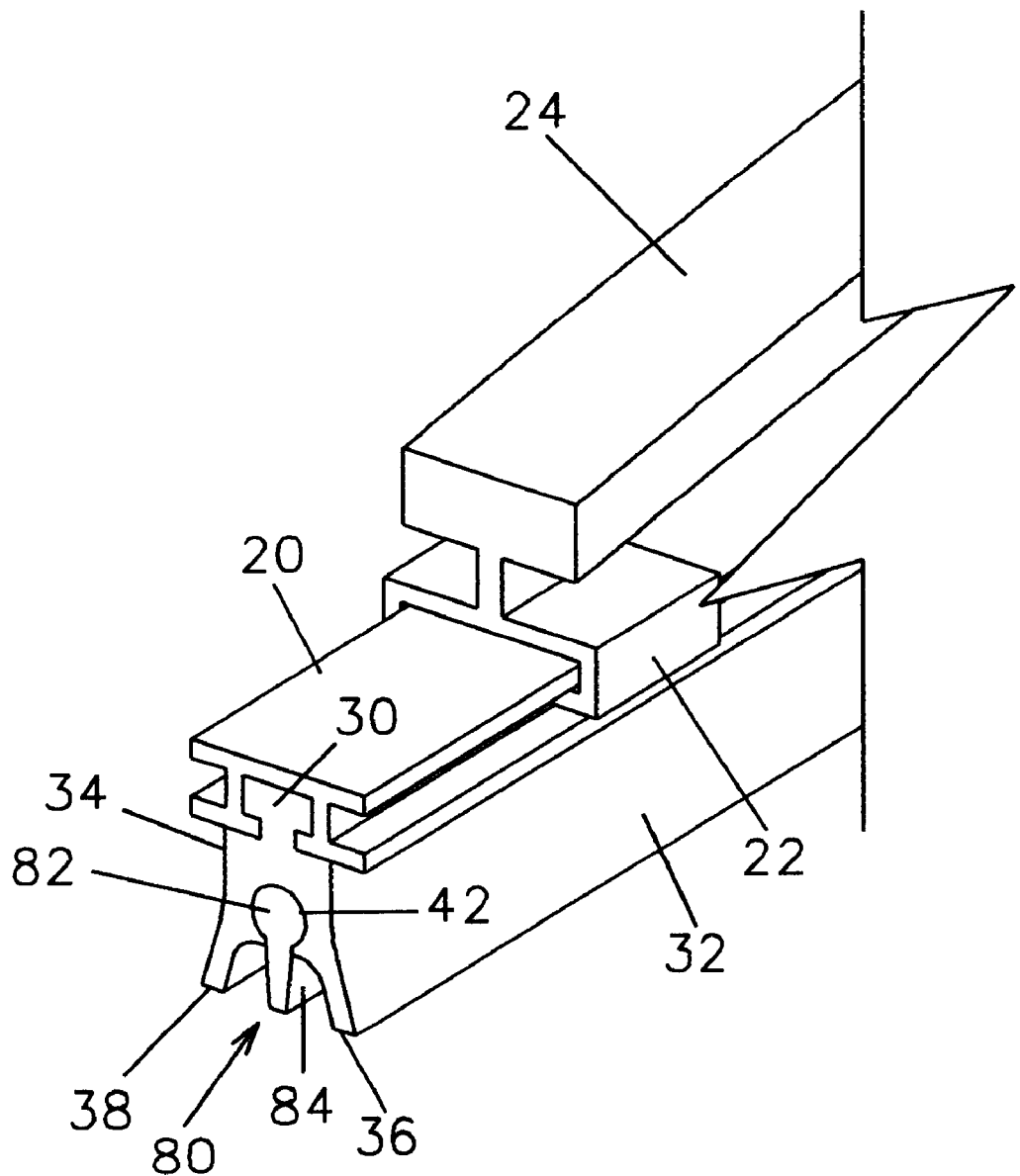
FIG. 5 is a fragmentary perspective view of the windshield wiper assembly of FIG. 1 on an enlarged scale with a third wiping surface inserted into the wiper blade housing.
Figure 7:
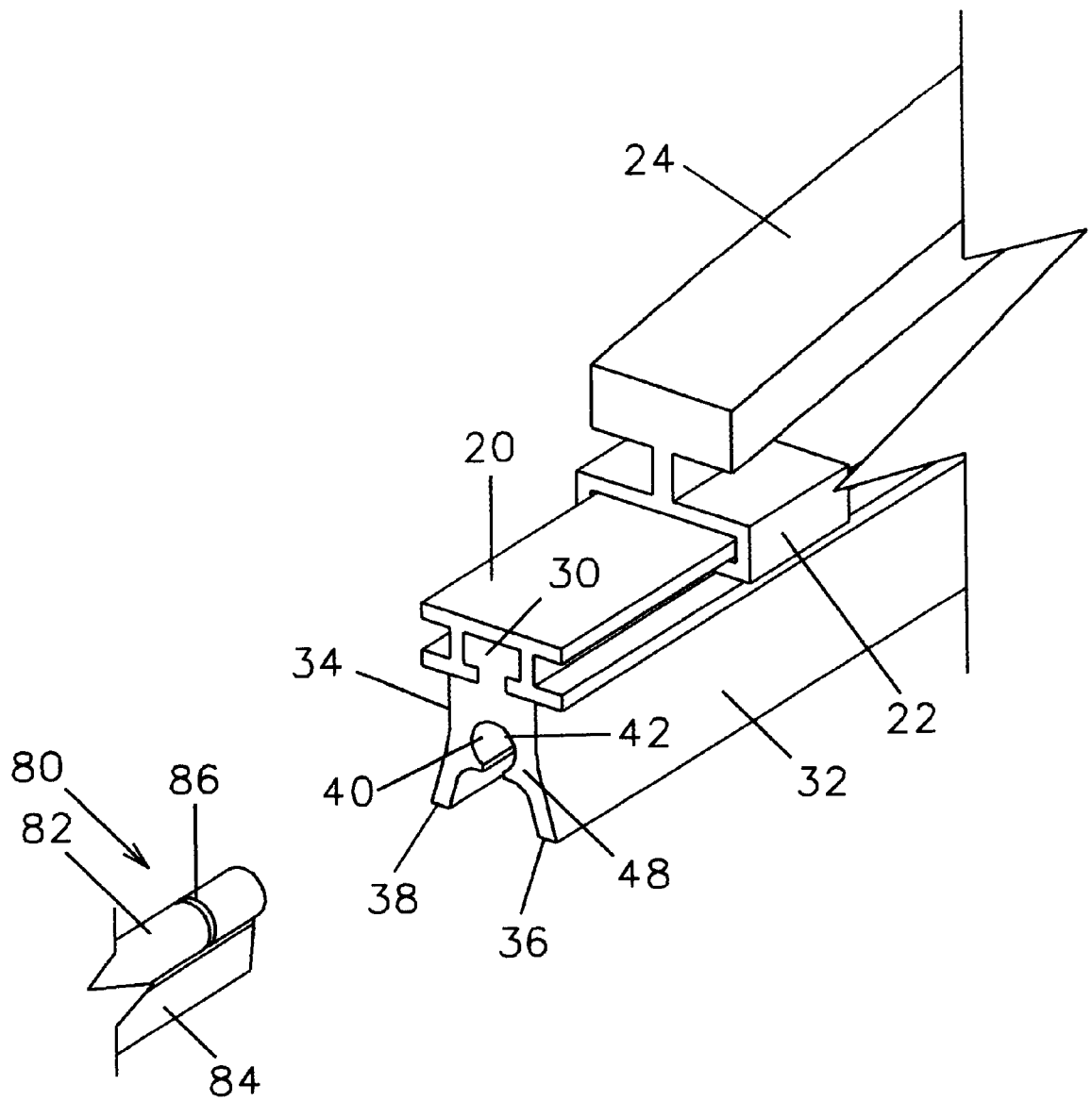
FIG. 7 is a fragmentary view of the windshield wiper assembly of FIG. 5 with the third wiper removed from the wiper housing.

The wiper assembly 10 further includes an auxiliary wiping member 80 (FIGS. 5, 7) having a spherical upper portion 82 configured for slidable insertion into the channel 40 of the housing 20 when the heating member 50 has been removed therefrom. The upper portion 82 presents a groove 86 positioned to releasably mate with flange 46 in the same manner previously described. The wiping member 80 further includes a wiping edge 84 depending from the upper portion 82 and extending between the side walls 32, 34 of the housing 20.

In use, the housing 20 is slidably coupled to retainer elements 22 which in turn are coupled to a conventional wiper arm 28 of a vehicle. In winter weather, the heating member 50 is slidably inserted into the channel 40 of the housing 20 and is held therein as the flange 46 is releasably seated within the groove 60. Upon activation of a switch 18 associated with the power supply of a vehicle, the power supply heats element 64, directly heating the windshield 14 and blade wiping edges 32, 35. Thus, ice present upon the windshield is melted by heat received directly from the heating element 64 and by heat received through contact with the heated wiping edges 36, 38. During periods of warmer weather, the heating member 50 may be disconnected from the battery 16 and interchanged with the auxiliary wiping member 80 for enhanced wiping of rain or other debris.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A windshield wiper assembly for connection to a retainer assembly and a power source in a vehicle, comprising:

a pair of flexible side walls presenting first and second wiping edges adapted for contact with a windshield;

a top wall spanning said side walls;

a channel defined by said top wall and said side walls and having an elongated opening facing away from said top wall;

an elongated heater member having a heating element adapted to be releasably connected to an electrical power source and having a structure which is releasably slidable in said channel, said heater member having a heated portion disposed outside said channel and having said heating element disposed within said heated portion;

a third wiper having a structure thereon slidable in said channel whereby said third wiper can be interchanged with said heater member, said third wiper having a third wiping edge located outside said channel and between said first and second wiping edges of said side walls when said structure of said third wiper is placed within said channel, said third wiping edge having a configuration adapted for contact with the windshield; and means for releasably connecting said heater element to an electrical power source, said heater element cooperating with said adjacent side walls to direct a resulting heat from said heating element onto said first and second wiping edges and the adjacent windshield.

2. A windshield wiper assembly as claimed in claim 1, further comprising a flange extending about an inner periphery of said channel, and a groove extending about an outer periphery of said heater member structure, said groove being configured to releasably mate with said flange for selectively holding said heater member in said channel.

3. A windshield wiper assembly as claimed in claim 1, wherein said heated portion of said heater member is adapted to contact the windshield.

4. A windshield wiper assembly as claimed in claim 3, wherein said heated portion of said heater member is formed of a material for precluding said heater member from abrasive contact with the windshield.

5. A windshield wiper assembly as claimed in claim 1, wherein said heater element comprises a wire embedded in said heated portion, said connecting means joining said wire to the power source.

6. A windshield wiper assembly as claimed in claim 5, wherein said connecting means comprises a plug at a free end of said wire; and a receptacle connected to the power source, an engagement of said plug with said receptacle coupling said wire to the electrical power source.

7. A windshield wiper assembly as claimed in claim 2, wherein said third wiper includes a groove to releasably mate with said flange upon said release of said heater member from said channel and insertion of said third wiper in said channel.

8. A windshield wiper assembly as claimed in claim 1, wherein said channel has a configuration complementary to the structure of said heater member and said third wiper.

9. A windshield wiper assembly for connection to said retainer assembly and a power source in a vehicle, comprising:

a housing adapted to be connected to the retainer assembly;

a top wall connected to said housing;

a pair of side walls depending from said top wall and presenting first and second wiping edges adapted for contact with a windshield;

a channel defined by said top wall and said side walls and having an elongated opening facing away from said top wall;

a heater member slidable in said channel, said heater member being interchangeable with a third wiper slidable in said channel; and means for connecting said heater member to an electrical power source of the vehicle, said heater member having a heated portion located outside said channel that cooperates with said adjacent side walls to direct a resulting heat from said heated portion onto said first and second wiping edges and the adjacent windshield.

10. A windshield wiper assembly as claimed in claim 9, wherein said heated portion is adapted for contact with the windshield.

11. A windshield wiper assembly as claimed in claim 10, wherein said heated portion is formed of a material for preventing said heated portion from abrasive contact with the windshield.

12. A windshield wiper assembly as claimed in claim 10, wherein said heated portion comprises a wire embedded therein.

13. A windshield wiper assembly as claimed in claim 12, wherein said connecting means comprises a plug at a free end of said wire; and a receptacle coupled to said electrical power source, said plug adapted to selectively engage said receptacle.

14. A windshield wiper assembly as claimed in claim 9, further comprising a flange extending about an inner periphery of said channel; and a groove extending about an outer periphery of said heater member configured to releasably mate with said flange for selectively holding said heater member in said channel.

15. A windshield wiper assembly as claimed in claim 9, wherein said channel has a generally cylindrical configuration.

16. A windshield wiper assembly as claimed in claim 15, wherein said heater member is configured to complementarily fit within said channel for insertion therein.

17. A windshield wiper assembly as claimed in claim 9, further comprising a flange extending about an inner periphery of said channel, said third wiper having a groove extending about an outer periphery of a mounting portion thereof, said groove being adapted to releasably mate with said flange for selectively holding said third wiper in said channel.

18. A windshield wiper assembly, comprising:

a wiper blade having a pair of flexible side walls defining first and second wiping edges adapted for contact with a windshield, and a top wall spanning said side walls, said top wall and said side walls cooperating to define an elongated channel between said side walls, said channel having an elongated opening facing away from said top wall;

an elongated heater member having a conductor means for releasably connecting to an electrical power source, a mounting structure which is releasably slidable within said channel, and an elongated heated portion supported by said mounting structure and located outside said channel and between said first and second wiping edges of said side walls when said mounting structure is placed within said channel.

19. The windshield wiper assembly of claim 18, further comprising a third wiper member having a mounting portion corresponding to the mounting structure of said elongated heater member and a third wiping edge adapted to contact a windshield, said third wiping edge being supported by said mounting portion and located outside said channel and between said first and second wiping edges of said side walls when said mounting portion is placed within said channel, said third wiper member being interchangeable with said heater member.

* * * * *